(12) United States Patent
Butterfield et al.

(10) Patent No.: US 6,366,362 B1
(45) Date of Patent: Apr. 2, 2002

(54) METHOD AND APPARATUS FOR ADJUSTING INPUT BINARY IMAGE HALFTONE DOTS USING TEMPLATE MATCHING CONTROLLED BY PRINT ENGINE XEROGRAPHIC DENSITY INFORMATION TO MAINTAIN CONSTANT TONE REPRODUCTION ON PRINTED OUTPUT OVER TIME

(75) Inventors: Paul M. Butterfield, Fairport; David C. Robinson, Penfield, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/220,051

(22) Filed: Dec. 23, 1998

(51) Int. Cl.$^7$ ................................. H04N 1/46
(52) U.S. Cl. .................. 358/1.9; 358/504; 358/523; 382/209
(58) Field of Search ................ 382/209, 217; 358/1.9, 504, 518, 523

(56) References Cited

U.S. PATENT DOCUMENTS

| 4,618,248 A | 10/1986 | Buchar |
| 5,053,822 A | 10/1991 | Butler |
| 5,210,572 A | 5/1993 | MacDonald et al. |
| 5,293,254 A | 3/1994 | Eschbach |
| 5,301,037 A | 4/1994 | Kang et al. |
| 5,307,119 A | 4/1994 | Folkins et al. |
| 5,329,599 A | 7/1994 | Curry et al. |
| 5,359,423 A | 10/1994 | Loce |
| 5,383,036 A | 1/1995 | Mailloux et al. |
| 5,387,985 A | 2/1995 | Loce et al. |
| 5,404,411 A | 4/1995 | Banton et al. |
| 5,436,705 A | 7/1995 | Raj |
| 5,479,584 A | 12/1995 | Curry |
| 5,483,605 A | 1/1996 | Rostamian |
| 5,521,677 A | 5/1996 | Brewington et al. |
| 5,543,896 A | 8/1996 | Mestha |
| 5,559,579 A | 9/1996 | Gwaltney et al. |
| 5,666,194 A | 9/1997 | Denton |
| 5,673,075 A | 9/1997 | Jacobs et al. |
| 5,724,455 A | 3/1998 | Eschbach |
| 5,729,634 A | 3/1998 | Robinson |
| 5,749,020 A | 5/1998 | Mestha et al. |
| 5,784,667 A | 7/1998 | Mestha et al. |

FOREIGN PATENT DOCUMENTS

JP 5-20460 * 1/1993 ........... G06F/15/70

* cited by examiner

Primary Examiner—Thomas D. Lee
(74) Attorney, Agent, or Firm—Fay, Sharpe, Fagan, Minnich & McKee, LLP

(57) ABSTRACT

A method and apparatus to maintain constant tone reproduction on a printed output over time. This is accomplished by performing template matching on a halftoned binary image prior to sending the binary image to a Raster Output Scanner (ROS). The template matching operation selectively replaces bit patterns in the binary image with template bit patterns, based on a detected xerographic density.

20 Claims, 7 Drawing Sheets

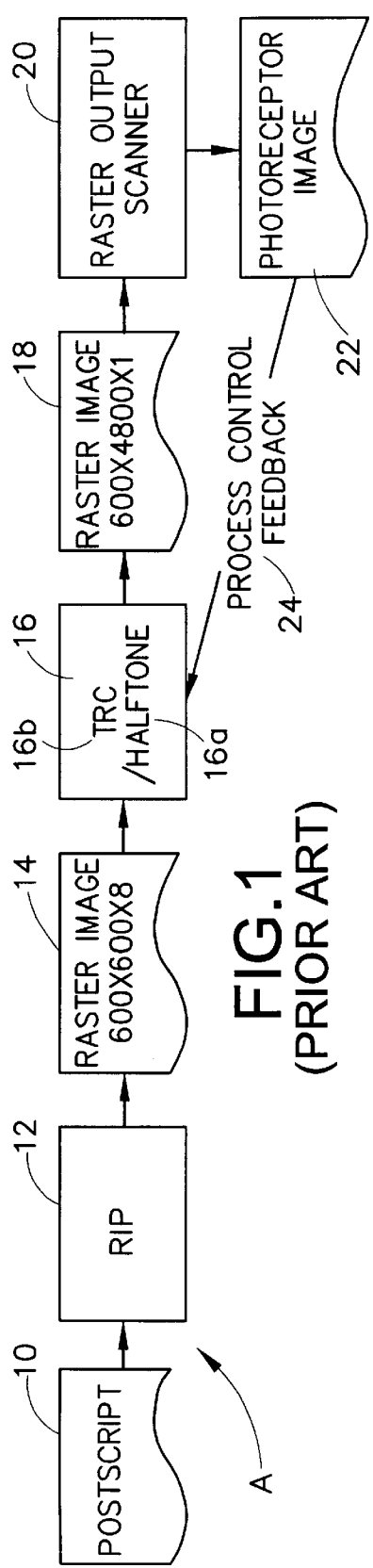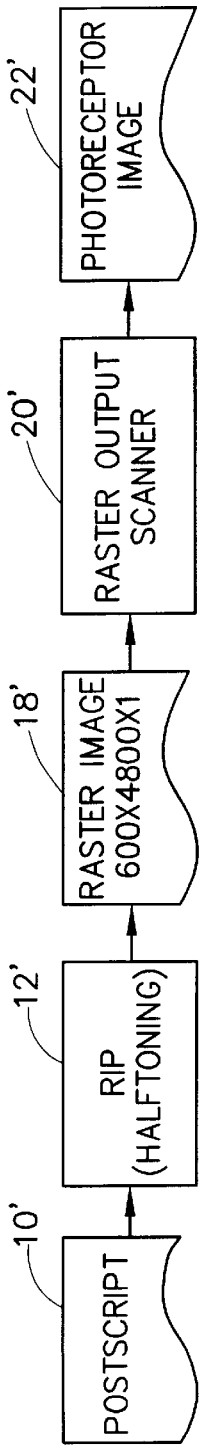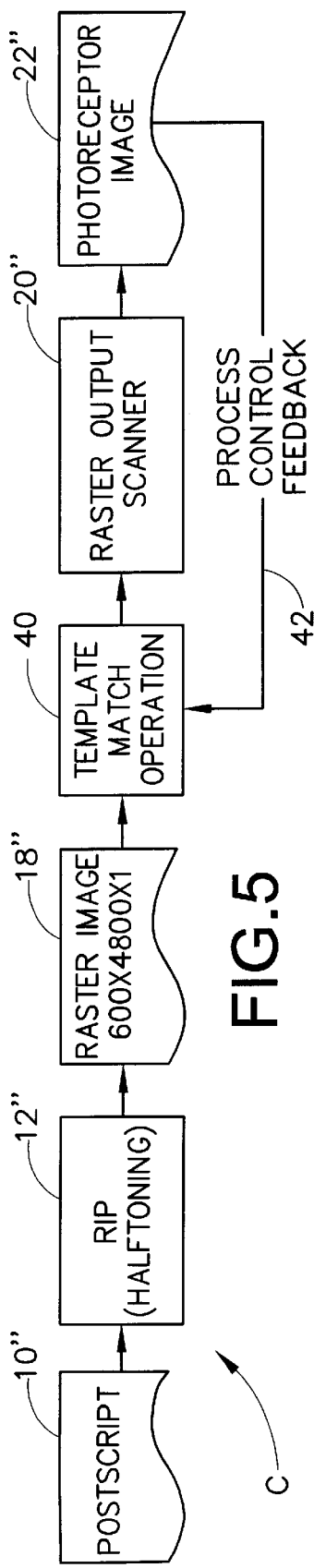

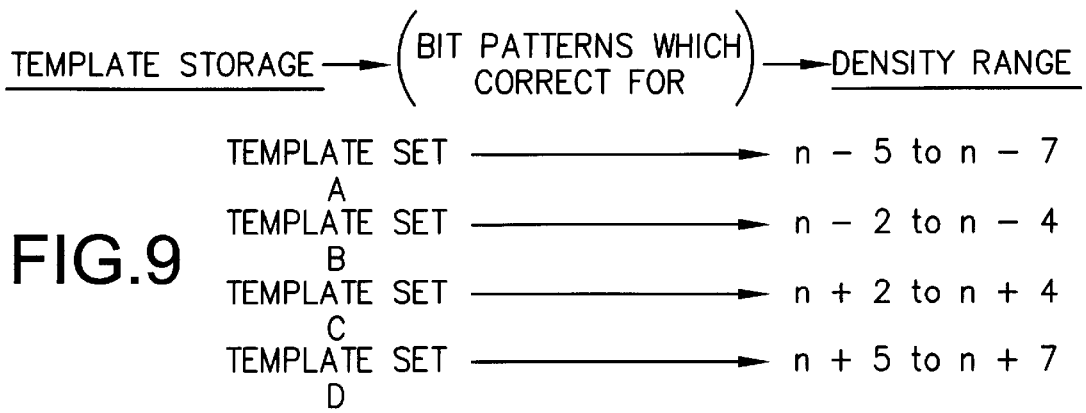
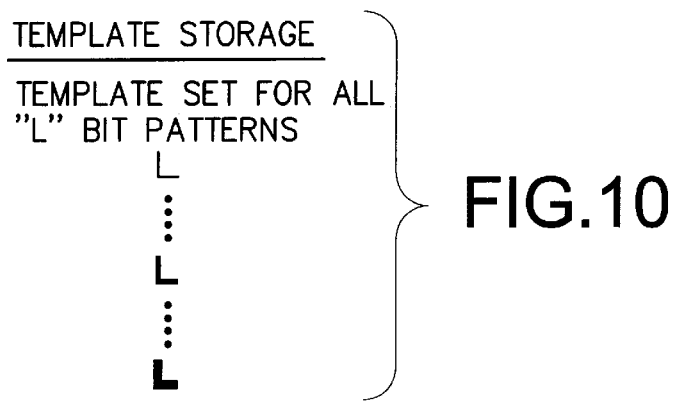
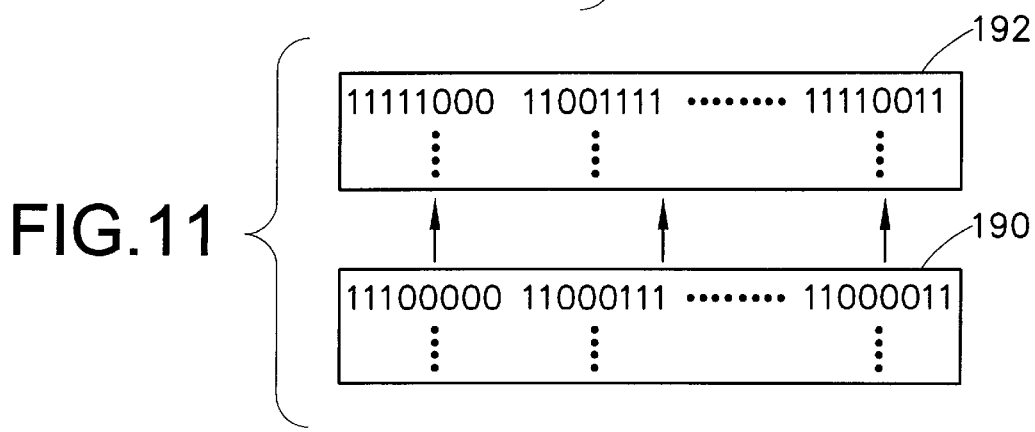
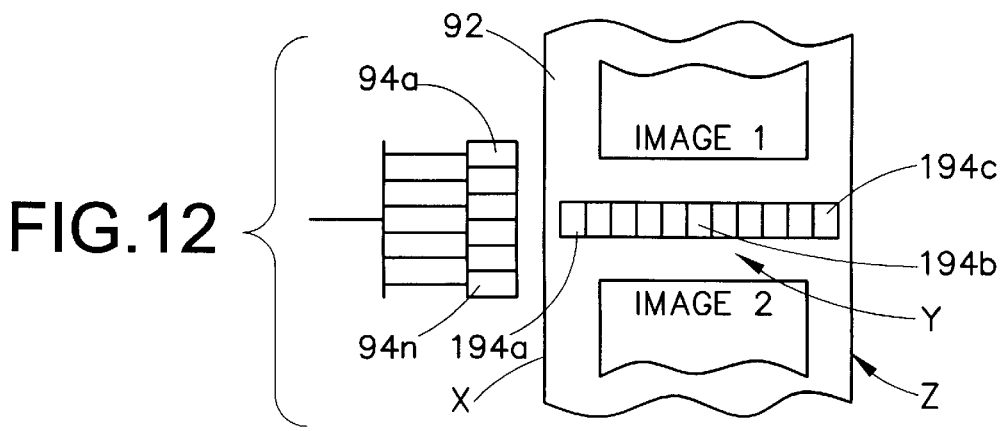

METHOD AND APPARATUS FOR ADJUSTING INPUT BINARY IMAGE HALFTONE DOTS USING TEMPLATE MATCHING CONTROLLED BY PRINT ENGINE XEROGRAPHIC DENSITY INFORMATION TO MAINTAIN CONSTANT TONE REPRODUCTION ON PRINTED OUTPUT OVER TIME

BACKGROUND OF THE INVENTION

This invention relates generally to an electrophotographic printing machine and more particularly concerns a method and apparatus which uses analog output information of a document reproduction device to provide real-time adjustment of a digitized image in order to adjust density output of printed color or monochrome documents.

By way of background, digital reproduction, transfer or display of original images on image output terminals begins by creating a digital representation of an original image. Commonly, the digital representation becomes a two-tone microstructure otherwise known as a bitmap. In conventional halftoning, multiple gray levels or gray densities in the original image are reproduced by varying the amplitude within a fixed spatial frequency of halftone microstructures (or halftone cells/dots). Continuous tone images or image portions are typically represented in binary format by creating halftone cells or dots, where each cell represents a gray level density within an area of picture elements pixels).

Methods of halftone digital image processing, encompassing the process steps of scanning or image acquisition through printing or display are known. In general, digital image output terminals (e.g. printers) are capable of creating spots within an area with a predetermined resolution (dots per unit area). In scanners, a single "spot" describes a multi-bit density response. Typically, input scanners may acquire density information at 256 levels of gray to describe a spot or pixel. By contrast, output terminals generally have two or another relatively small number of levels to reproduce image information.

In printing systems maintaining stability and accuracy as to the amount of a marking material (e.g. toner or ink) being applied to a print surface is a major concern. Specifically it is known that due to varying conditions the amount of marking material (e.g. cyan, magenta, yellow and black toner or ink) will fluctuate from a predetermined value. For example, humidity, toner or ink age, machine calibration, toner or ink quality can all cause the amount of marking material applied to a print surface to vary.

Therefore, in color and black and white copiers or printers, a common technique for monitoring the quality of documents is to artificially create test patches of predetermined desired densities. The actual density of the toner of the test patches can then be optically measured to determine the effectiveness of the printing process in placing this printing material on the print sheet.

In the case of xerographic devices, the surface that is typically of most interest in determining the density of printing material is the charge-retentive surface or photoreceptor, on which the electrostatic latent image is formed and subsequently, developed by causing toner particles to adhere to areas that are charged in a particular way. In such a case, the density detector for determining the density of toner on the test patch, which is often referred to as a "densitometer", is disposed along the path of the photoreceptor directly downstream of the development unit. There is typically a routine within the operating system of the printer to periodically create test patches of a desired density at predetermined locations on the photoreceptor by deliberately causing the exposure system to charge or discharge, as necessary, the surface at a predetermined location.

The test patches are moved past the development unit and the toner particles within the development unit are caused to electrostatically adhere to the test patches. The denser the toner on the test patches, the darker the test patches will appear in optical testing. The developed test patches are moved past a density detector disposed along the path of the photoreceptor, and the light absorption of the test patch is tested; the more light that is absorbed by the test patch, the denser the toner on the test patch. Xerographic test patches are traditionally printed in the inter-document zones on the photoreceptor. They are used to measure the deposition of toner on paper to measure and control the toner reproduction curve (TRC). A common method of process control involves scheduling solid area, uniform halftones or background in test patches. High quality printers will often contain many test patches.

Depiction of a process whereby a printing machine maintains output print density is illustrated in FIG. 1. Shown is an image path A for a printing machine where a page description module (which implements a page description language (PDL) such as, but not limited to, PostScript) 10 forwards image information to Raster Image Processor module (RIP) 12. The RIP generates a rasterized image (in this example, a 600×600×8 image) 14. Through this procedure a contone image (e.g. having cyan, magenta, yellow and black) is described in a gray level format. Contone Rendering Module (CRM) 16 receives rasterized image 14 and performs a halftoning operation 16a of the rasterized image 14 in accordance with a predetermined tone reproduction curve (TRC) 16b. The CRM 16 then generates a rasterized binary (bitrmapped) image having a high addressability factor (e.g. 600×4,800×1) 18. This binary image is provided to Raster Output Scanner (ROS) 20 which in turn generates photoreceptor image 22. Using photoreceptor image 22, normal known xerographic operations are undertaken for the generation of a color print.

Consistent tone reproduction is a high priority in color production markets. Even slight (e.g. $2\Delta E_{cmc}$) color changes within a job can be objectionable to a customer. Within the architecture described in FIG. 1, constant tone reproduction for printed outputs over time is maintained by feeding real-time (inter-document zone) xerographic density information to CRM 16 of the print engine. CRM 16 applies an appropriate TRC 16b to each contone image and then the image is halftoned to a binary high-addressable image space understood by ROS 20.

Data concerning the xerographic density of patches on photoreceptor image 22 are provided to the CRM 16 by process control feedback 24. In order to maintain a stable printing operation despite the fact that the print engine output may be varying, the tone reproduction curve (TRC) 16b is applied immediately before the halftoner operation 16a. Thus, if the signal from process control feedback 24 indicates the xerographic density values are off a nominal amount, TRC 16b is changed in front of halftoner operation 16a in order to provide desired print outputs. For example, if the printer is determined to be printing overly high yellow amounts of toner, the tone reproduction curve will be adjusted slightly down so that the yellow toner amount requested is decreased, thereby maintaining a stable printing output.

However, under the foregoing process there exists a need to be able to update TRC 16b on the print engine CRM 16 due to the possibility of a customer job not completely printing before the xerographic density state has changed. In a machine implementing image path B, if the xerographic density state changes during the time a job is printing, this system which undertakes an original halftoning process at RIP module 12, is forced to re-RIP the job in progress. The re-RIP would be done with the new xerographic density information. Due to this productivity impact, as well as the cost involved in providing a machine having such capabilities, quality benefits provided by a RIP that halftones is not fully attained.

A further drawback of the foregoing system is that the halftone operation must be accomplished in a real-time operation, which in turn requires implementation of halftoner 16a in CRM 16 which increases the cost of such a printing machine.

Therefore, it has been determined desirable to provide a method and apparatus that effectively adjusts the ROS image TRC after the image is in a binary printable space, and where the real-time adjustment may be made in reaction to a change in the xerographic density state.

SUMMARY OF THE INVENTION

A concept of the present invention is to perform a RIP to a binary (bitmapped) halftoned image (e.g. 600×4,800×1). Then the information received from xerographic density detectors monitoring the photoreceptor image allows for this xerographic density information to be used to change binary bit patterns of the bitmapped image instead of attempting to change a contone pattern. One manner of performing this change is through the application of a template matching operation.

Using the procedure of the present invention, a xerographic density detector sends a signal which indicates the status of xerographic density of test patches on the photoreceptor. The system is designed to monitor each of the individual colors (e.g. cyan, magenta, yellow and black) which are represented by the test patches. When a particular color is determined to be running at a level above or below a predetermined bit density value, information obtained by a scanning operation is reviewed. The information corresponds to at least a portion of an image which is to be printed. When a specific bit pattern or state is detected a template matching process is undertaken, wherein a determination is made as to whether a template matching the scanned image bit pattern exists in a template storage. When such a template is found to exist, the appropriate template is used in place of a corresponding scanned image area in order to counteract the faulty operation of the xerographic printer. In this process the system looks at one halftone dot and indicates that the dot is either too large or too small for the amount of a predetermined acceptable bit density. Therefore, to adjust the binary bit pattern, an appropriate template with either larger or smaller dot patterns are substituted. The final outcome therefore, results in an amount of toner or ink being applied to the document such that the desired output is achieved.

BRIEF DESCRIPTION OF THE DRAWINGS

The invention may take form in the various components and arrangements of components, and in various steps and arrangements of steps. The drawings are only for purposes of illustrating a preferred embodiment and are not to be construed as limiting the invention.

FIG. 1 is a block diagram of an image path incorporated into an existing printing machine;

FIG. 4 is an alternative image path to the image path shown in FIG. 1;

FIG. 5 is an image path of a printing machine incorporating the concepts of the present invention;

FIGS. 9 and 10 illustrate template storage configurations in accordance with the teachings of FIGS. 7 and 8;

FIG. 11 diagrammatically illustrates substitution of a bit pattern detected during the scanning operation and a template bit pattern being substituted therefore; and FIG. 12 illustrates a configuration for refined bit density detection which may be used in refined template-matching techniques.

DETAILED DESCRIPTION OF THE PREFERRED EMBODIMENTS

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 2:
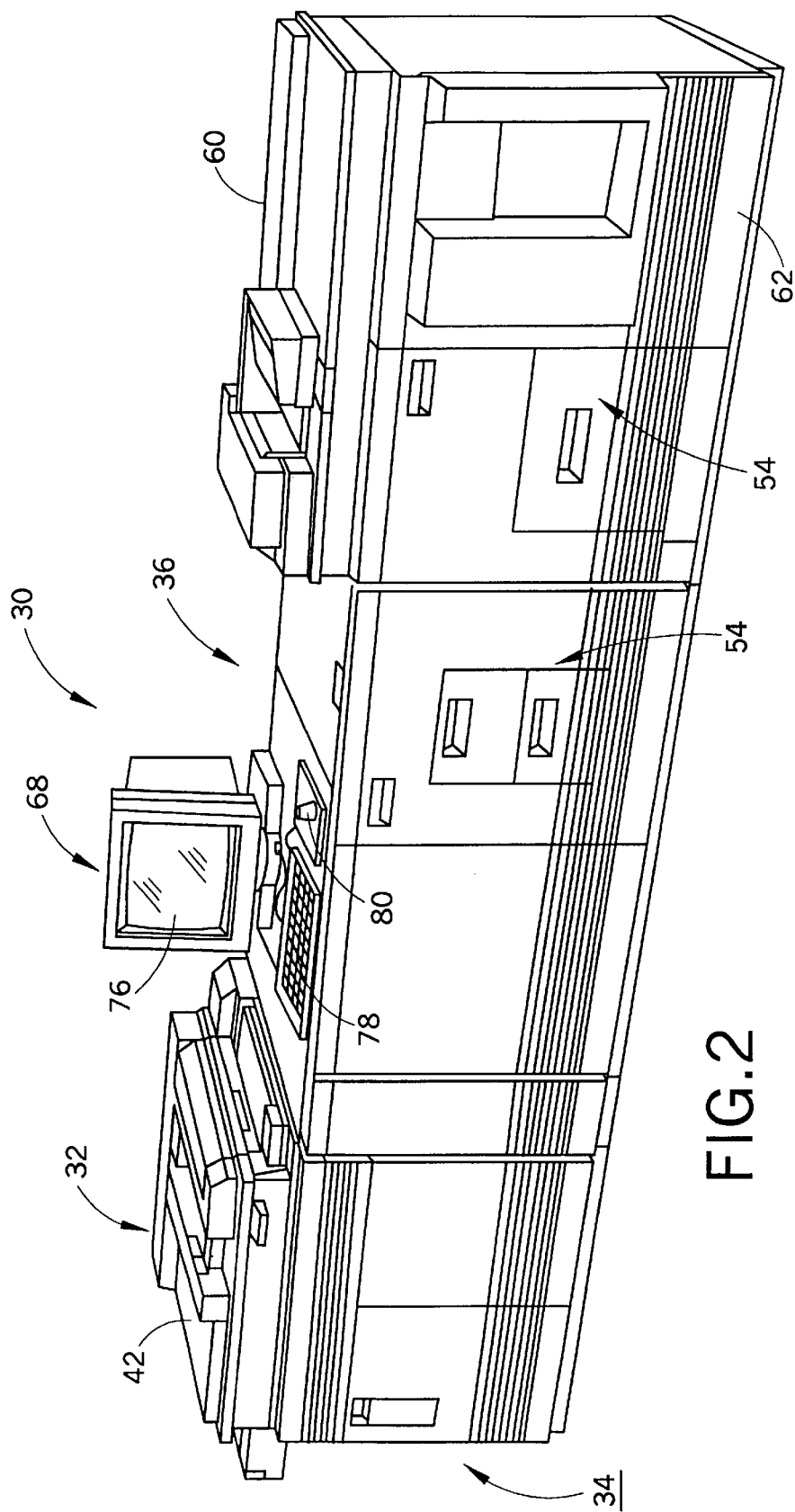
FIG. 2 is a view depicting an electronic printing system appropriate for implementing the document processing technique of the present invention.
Figure 3:
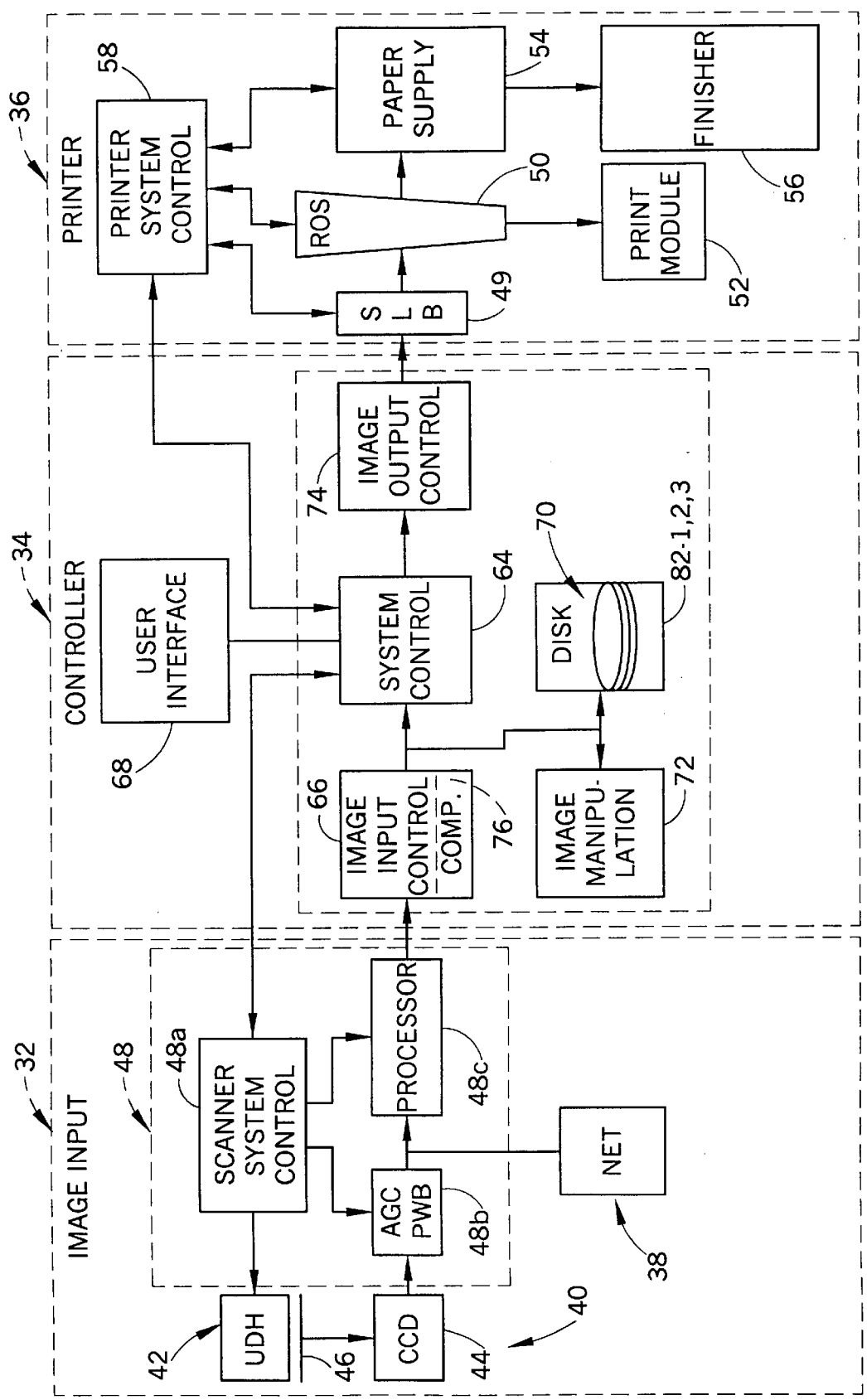
FIG. 3 is a block diagram depicting the major elements of the printing system shown in FIG. 1.

Referring now to the drawings, wherein the showings are for purposes of illustrating a preferred embodiment of the invention only and not for purpose of limiting same, FIGS. 2 and 3 illustrate an exemplary image printing system 30 which can incorporate the teaching of the present invention for processing print jobs. Printing system 30, for purposes of explanation, is divided into image input section 32, controller section 34, and printer section 36. In the example shown, the image input section 32 has both remote and on-site image inputs, enabling system 30 to provide network, scan, and print services. Other system combinations may be envisioned such as a stand alone printing system with on-site image input (i.e., a scanner), controller, and printer; a network printing system with remote input, controller, and printer; among other configurations.

While a specific printing system is shown and described, the present invention may be used with other types of printing systems. For example, printer section 36 may instead use a different printer type such as ink jet, ionographic, thermal, photographic, among others, and, furthermore, may be incorporated in electronic display systems, such as CRTs, LCDs, LEDs, among others or else other image scanning/processing/recording systems, or else other signal transmitting/receiving, recording systems, among others.

For off-site image input, image input section 32 has a network 38 with a suitable communication channel such as an EtherNet® connection enabling image data in the form of image signals or pixels from one or more remote sources to be input to system 30 for processing. Where the Page Description Language (PDL) of the incoming imaging data is different than the PDL used by system 30, suitable conversion means (not shown) are provided. Other remote sources of image data such as streaming tape, floppy disk, video camera, among others are within the scope of this invention.

For on-site image input, section 32 has a document scanner section 40 with a Universal Document Handler (UDH) 42 for the purpose of automatically and sequentially placing and locating sets of multiple documents for scanning. Scanner section 40 incorporates one or more linear light sensitive arrays 44 for reciprocating scanning movement below platen 46 and focused on a line-like segment of platen 46 and the document being scanned thereon. Array 44, which may utilize Charge-Coupled Device (CCD) technology or the like, provides image elemental signals or pixels representative of the image scanned which are input to processor 48 for processing.

Processor 48 communicates with the controller section 34 includes a scanner system control 48a, an automatic gain control printing wiring board (AGCPWB) 48b and a processor 48c. AGCPWB 48b converts the analog image signals output by array 44 to digitally represented facsimile signals, and processor 48c processes the digital image signals as required to enable controller section 34 to store and handle the image in the form and order required to carry out the job programmed. After processing, the image signals are output to controller section 34. Image signals derived from network 38 are similarly input to processor 48c.

Processor 48c also provides enhancements and changes to the image signals such as filtering, thresholding, screening, cropping, scaling (reduction/enlargement), etc. Following any changes and adjustments in the job program which affect these image processing parameters, the document must be rescanned to capture the specified modification.

Printer section 36 comprises a laser type printer having a Scan Line Buffer 49, Raster Output Scanner (ROS) 50, Print Module 52, Paper Supply 54, Finisher 56, and Printer System Control 58. ROS 50 has a two beam laser with the beams modulated in accordance with the content of an image signal input by acousto-optic modulator to provide dual imaging beams which are scanned across a moving photoreceptor of Print Module 52 by means of a rotating polygon. This exposes two image lines on the photoreceptor with each scan to create the latent electrostatic images represented by the image signal input to the modulator.

The latent electrostatic images are developed and transferred to a print media delivered by paper supply 54. As will be appreciated by those skilled in the art, print media can comprise a selected one of various known substrates which are capable of accepting an image, such substrates including transparencies, preprinted sheets, vellum, glassy covered stock, film or the like. The print media may comprise any of a variety of sheet sizes, types, and colors, and for this, plural media supply trays are provided. The transferred image is permanently fixed or fused and the resulting prints discharged to either output tray 60 (FIG. 2), or to finisher 62. Finisher 62 provides certain finishing selections such as a stitcher for stitching or stapling the prints together to form books, a thermal binder for adhesively binding the prints into books, and/or other finishing options such as slitting, perforating, sadle stitching, folding, trimming, or the like.

Printer system control 58 (FIG. 3) automatically and precisely controls all the printer functions and operations in accordance with job program parameters received from system control 64 of controller section 34, as well as from internally derived signals from sensors and processes within the printer section 36. Printer system control signals are derived and distributed via a plurality of printed wiring boards (PWBs) in a multi-processor architecture characterized by multiple microprocessor controller cores, serially interconnected, and also serially linked to more numerous input/output processing circuit PWBs. Controller section 34 is, for explanation purposes, divided into an image input control 66, User Interface (UI) 68, system control 64, main memory 70, image manipulation section 72, and image output control 74. The units 66, 64, 70, 72, 74 comprise a system which may also generally be referred to as the "Electronic Subsystem" (ESS).

The scanned image data input from processor 48c of scanner section 40 to controller section 34 is compressed by image compressor/processor 67 of image input control 66 and placed in an image file. Image files, which represent different print jobs, are temporarily stored in system memory (not shown) pending transfer to main memory 70 where the data is held pending use.

Referring again to FIG. 2, UI 68 includes a combined operator controller/CRT display consisting of an interactive touchscreen 76, keyboard 78, and mouse 80. UI 68 interfaces the operator with printing system 30, enabling the operator to program print jobs and other instructions, and to obtain system operating information, visual document facsimile display, programming information and icons, diagnostic information and pictorial views, etc. Items displayed on touchscreen 76 such as files and icons are actuated by either touching the displayed item on screen 76 with a finger, or by using a mouse or other input device to move a cursor to the item for selection.

Main memory 70 (FIG. 3) has plural hard disks 82-1, 82-2, 82-3 for storing machine Operating System software, machine operating data, and the scanned image data currently being processed. When the compressed image data in main memory 70 requires further processing, or is required for display on touchscreen 76 of UI 68, or is required by printer section 36, the data is accessed in main memory 70. Where further processing other than that provided by processor 48 is required, the data is transferred to image manipulation section 72 where the additional processing steps such as collation, make ready (document editing), decomposition, rotation, etc., are carried out. Following processing, the data may be returned to main memory 70 sent to UI 68 for display on touchscreen 76, or sent to image output control 74.

With attention to FIG. 4, an image path B is depicted for a printing machine which eliminates the generation of rasterized image (e.g. 600×600×8) 14 and Contone Rendering Module (CRM) 16 of image path A, illustrated in FIG. 1. While a printing machine implementing image path A of FIG. 1 provides robust process control, it is achieved at high economic and productivity costs, and receives no quality benefit from high resolution RIP 12. On the other hand, image path B which employs page description language module 10', high resolution RIP (which incorporates half-toning operations) 12', binary raster image (e.g. 600×4,800× 1) 18', and Raster Output Scanner (ROS) 20' to generate photoreceptor image 22', allows for attainment of quality benefits from use of high resolution RIP 12', and is a more economical printing machine than a machine constructed in accordance with image path A. However, a drawback of a machine using image path B is that there is no process control for maintaining stability of printing output over time.

Therefore there is a high likelihood that the quality of the prints for such a printing machine, as shown in FIG. 4, will not be acceptable to a user over an extended period of time.

Turning more specifically to the present invention, FIG. 5 illustrates an image path C for a printing machine incorporating the concepts of the present invention. Similar to FIGS. 1 and 4, a page description module 10" having image data supplies the image data to a RIP module (which incorporates halftoning operations) 12". However unlike image path A (but similar to image path B of FIG. 4) contone raster image (e.g. 600×600×8) 14 and contone rendering module (CRM) 16 are not required. Rather, RIP module 12" transforms the image information directly into a binary halftoned raster image (e.g. 600×4,800×1) 18". Thereafter, and distinguished from previous systems, a template matching module 40 is provided between binary halftoned image 18" and ROS 20". The ROS 20" uses bit patterns supplied from template matching module 40 to generate photoreceptor image 22", which is in turn used in xerographic operations to produce a requested print.

Process control feedback 42 of image path C is a detector system used to detect xerographic density information regarding test patches formed on the photoreceptor. This information is transmitted to template matching module 40.

Concepts and techniques for generating test patches on photoreceptors, and acquiring data as to the xerographic density of the test patches are well known and various implementations are disclosed in the patents to: Mestha et al., U.S. Pat. No. 5,784,667 and U.S. Pat. No. 5,749,020; Jacobs et al., U.S. Pat. No. 5,673,075; Denton, U.S. Pat. No. 5,666,194; Gwaltney et al., U.S. Pat. No. 5,559,579; Mestha, U.S. Pat. No. 5,543,896; Brewington et al., U.S. Pat. No. 5,521,677; Raj, U.S. Pat. No. 5,436,705; MacDonald et al., U.S. Pat. No. 5,210,572; Butler, U.S. Pat. No. 5,053,822; and Buchar, U.S. Pat. No. 5,618,248. The foregoing patents are commonly assigned to the assignee of the present application, and are hereby incorporated by reference.

Thus, unlike FIG. 1 where the image is processed by RIP 12, to contone image 14, the image in FIG. 5 is RIPed directly to binary image 18. Since the raster image processing by RIP module 12", as opposed to 16b, does not need to be accomplished in real-time, a less expensive halftoning algorithm may be implemented thereby lowering the cost of the printing machine.

Figure 6:
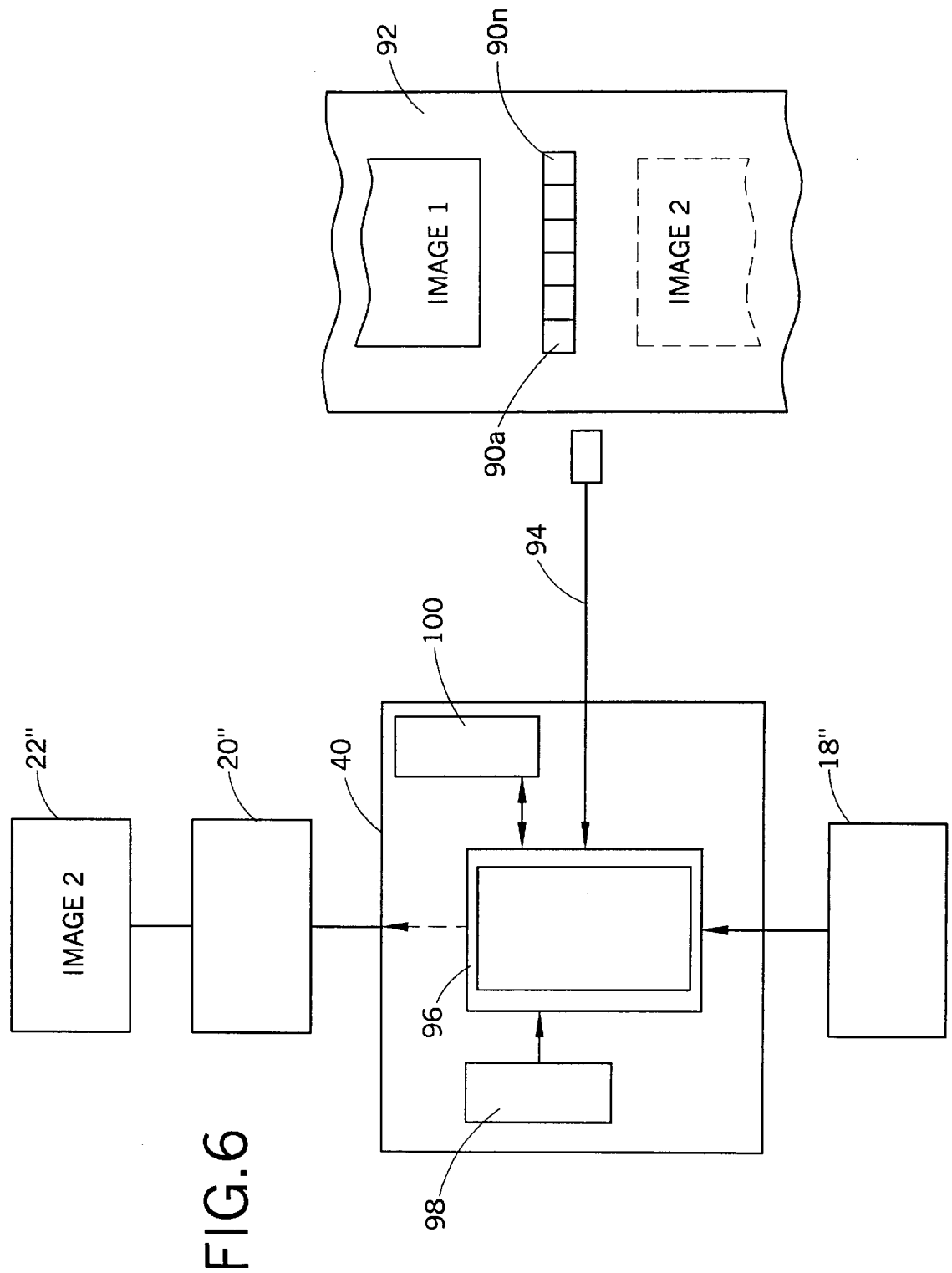
FIG. 6 is an illustrative description of an apparatus for adjusting the input binary image halftone dots using the template-matching operation of the present invention controlled by the print engine xerographic density information.
Figure 7:
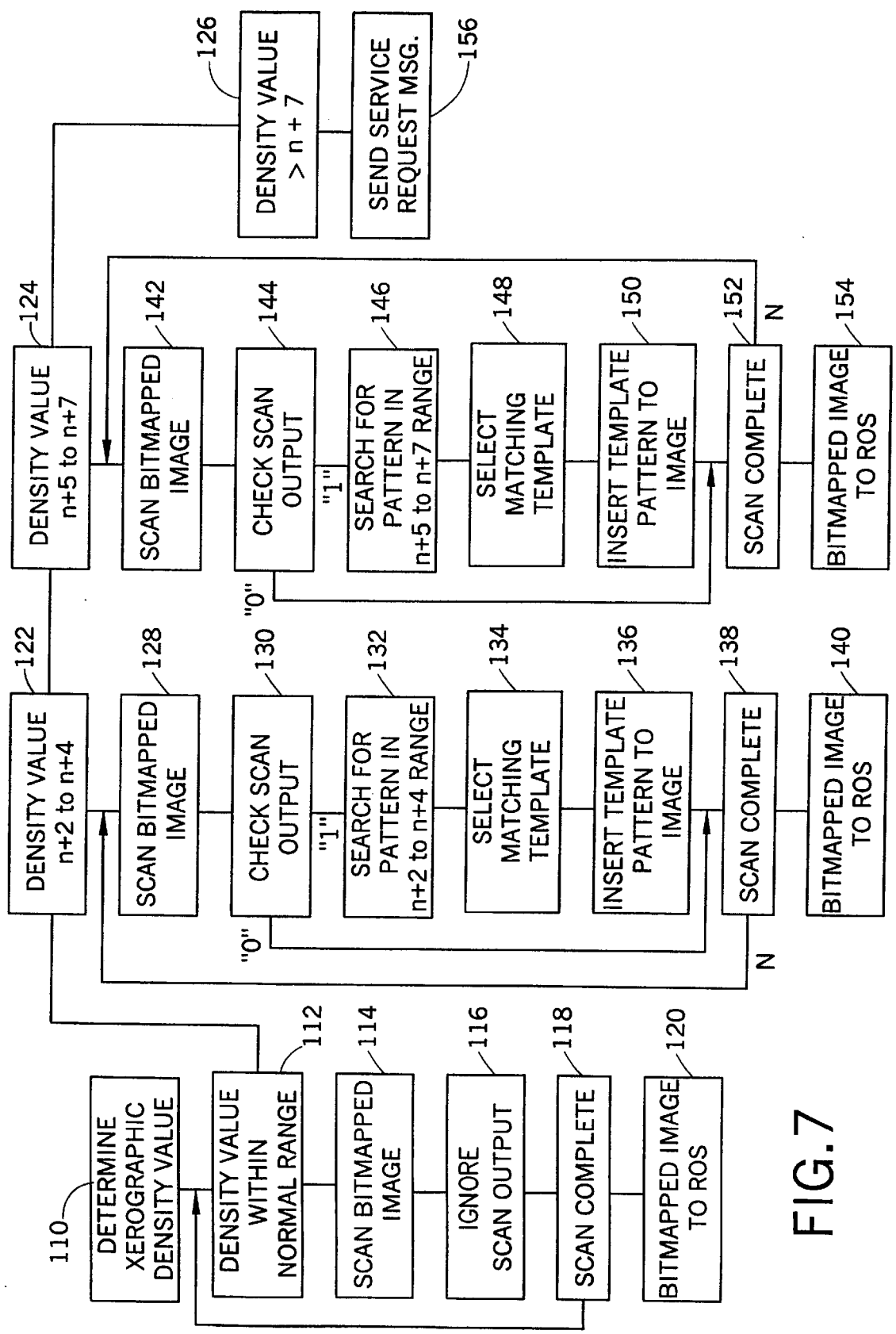
FIG. 7 is a flow chart depicting steps involved in adjusting the input binary image halftone dots using template-matching processing in accordance with a device as shown in FIG. 6.

Turning to FIG. 6, an illustrative description of the present invention is provided, in conjunction with the flowchart of FIG. 7. In particular, test patches 90a–90n are shown in an inter-document zone following Image 1 on photoreceptor 92. A process state detector arrangement 94 detects the density of test patches 90a–90n and sends this status information to template matching block 96 of template matching module 40. This information may be sent continuously to template matching module 40 or it may be sent at predetermined intervals. The above noted test patches being formed of a marking material such as toner or ink or by another known technique.

Template matching module 40 is configured to receive binary raster image 18", and also includes bitmap scanner arrangement 98, and template storage 100. It is to be appreciated that while the above-described elements are shown in block diagram formats, specific configurations of these elements are known in the art, and a variety are taught by material which has been incorporated herein by reference. It is also to be appreciated that while the foregoing elements are depicted as existing within template matching module 40, they may exist physically distant from module 40 but nevertheless can be used in the process described herein. For example, template storage 100, while shown in template matching module 40, may in fact exist in a memory location separate from module 40.

It is to be appreciated that process state detector arrangement 94, may be any device which detects and/or interprets density when defined as the negative log of reflectance, or when density is defined as a visually significant imaging material per unit area. For example, process state detector arrangement 94, may be a density detector, an L* detector or any other direct or indirect indicator of a process state including but not limited to photoreceptor voltage, or ambient humidity. Further, while the foregoing has been described in connection with the detection of color patches on a photoreceptor, the patches may be monochrome, and the patches (or other shape) may be located on a document including but not limited to paper.

Image 2, shown by dashed lines, is the image which will be produced by the processing to be discussed. Thus, the knowledge obtained from the test patches 90a–90n on photoreceptor 92 is applied to the development of Image 2 shown by dashed lines.

Turning to FIG. 7, a basic outline for one embodiment of an operation occurring within template matching module 40 is set forth. Initially, the measured xerographic density value from the density detector system 94 is acquired (110). A determination is then made as to whether the xerographic density value is within a pre-determined nominal bit density range (112). When within the nominal bit density range, bitmap scanner arrangement 98 begins scanning the received binary raster image 18" (114). If the actual xerographic density value is within the nominal range, information obtained by the scanning process is ignored (116). A determination is then made as to whether the scanning process is completed (118). If not completed the system moves back to block (114) and process steps 114–118 are repeated. If the scanning is completed the process is ended and the unaltered bit-mapped image is forwarded for raster output scanning (e.g. ROS 20") (120). It is to be appreciated that in alternative embodiments the scanning process may not even be started as long as the detected xerographic density value is within the normal range or greater than n+7, (where in this example each increment can be designed to represent 0.1 density units) and the binary raster image may be sent directly to ROS 20".

When in step (112) the xerographic density value is found not to be within the nominal range, a determination is made as to how far it is from the nominal range (e.g. is the actual values within a selected range: n+2 to n+4; n+5 to n+7; or greater than n+7) (122–126). If, for discussion purposes, it is determined the detected xerographic density is in the range n+2 to n+4 (122), the following steps take place.

The image scanning process begins (128) and the system moves from an overall no operation (no-op) state into one where the output of the scanner is detected (130). One particular scanning technique is to determine if white ("0") or black ("1") pixels are encountered. When the step of checking the scan output (130) determines that a black pixel ("1") is encountered, the bit pattern which is being investigated is compared to stored templates to determine whether a template exists with a bit pattern matching the scanned bit pattern (132). When a template is found which matches the scanned image bit pattern, that template—which will result in an output print having the nominal bit density value—is selected (134), and replaces the existing scanned image bit pattern (136). It is next determined whether the scanning operation is complete (138), and if it is determined such scanning is complete, the process ends and the bitmapped image (with at least a portion of its bit pattern replaced) is forwarded for raster output scanning (e.g. ROS 20") (140). When the scanning process is not complete the process moves to step 128, and steps 128–138 are repeated.

On the other hand, as long as white pixels ("0") are encountered (130), then a no-operation state is maintained and the system transfers to step (140). If scanning is not determined to be complete, the system moves to block (128) and repeats steps (128–138).

With the actual xerographic density in the range of n+5 to n+7 (124), steps (142–152) are undertaken in a manner similar to steps (128–140). Also, a finding that xerographic density is greater than n+7(126), means the difference between the pre-determined desired bit density value and the actual xerographic density value is too large to be corrected, and a service call signal is activated (156).

In the foregoing embodiment, the templates stored in template storage 100 would be configured in a storage arrangement wherein all images which correct xerographic density values in the range n+2 to n+4 are in a separate area from images which correct xerographic density values found to be within the range of n+5 to n+7. In other words, when steps (132) or (146) are undertaken, the system will be looking at image patterns which are in a set of templates known to provide a proper adjustment to bring the density value of the image to be printed into a nominal range.

It is appreciated that other approaches for the template scanning techniques are available. For instance, turning to FIG. 8 a second approach is depicted. Under this process, steps (160–170) are substantially identical to steps (110–120) of FIG. 7. However, in step (162), when it is determined xerographic density values are outside the nominal range, the process passes to step (171) to determine if the xerographic density value is greater than n+7, a service request signal is generated (173). On the other hand, when the xerographic density value is outside the nominal range but not greater than n+7 the system moves to scanning step (172). Thereafter, a determination is made as to whether a certain pattern or state is encountered (e.g. if a black pixel ("1") is encountered) (174). The process then determines whether the template storage includes images which match the detected pattern (176). In this case, for instance, if the image pattern is for a "L" a determination is made as to whether the template storage includes "L" bit patterns. There may be a plurality of "L" bit patterns within the template storage each which may be appropriate for different density values. All of the "L" patterns are located within an "L" template set. In step (178), the detected xerographic density value which is outside the nominal range is compared with the "L" template set to determine the "L" bit-pattern which should be used to ensure the output image will be within a desired density range. If the scanning is complete (184) the image is moved to ROS (186), if not steps (172–184) are repeated.

In this embodiment, the template storage is configured where a group of templates matching a particular image, but having different correction ratios are grouped together.

It is to be appreciated the foregoing is simply two embodiments which could occur within template matching module 40. Other specific scenarios may be contemplated for processing. However, the essential concept of using the xerographic density values to alter the binary image data is an outcome of each of the different embodiments.

FIG. 9 further illustrates the template storage concepts previously discussed. A template set A will include all image patterns which will correct for xerographic density values within an n–5 to n–7 range; a template set B stores all image patterns which correct for an n–2 to n–4 xerographic density range; template set C includes images which correct for all xerographic density values in a range of n+2 to n+4; and template set D groups all the image patterns which correct for the xerographic density value range of n+5 to n+7. Thus, in connection with FIG. 7, once the range of the xerographic density is determined, the search for an appropriate template will be within a template set corresponding to that range.

It will be noticed that there are no image patterns associated with the nominal range (n–1 to n+1) or to image ranges which are less than n–7 or greater than n+7.

Figure 8:
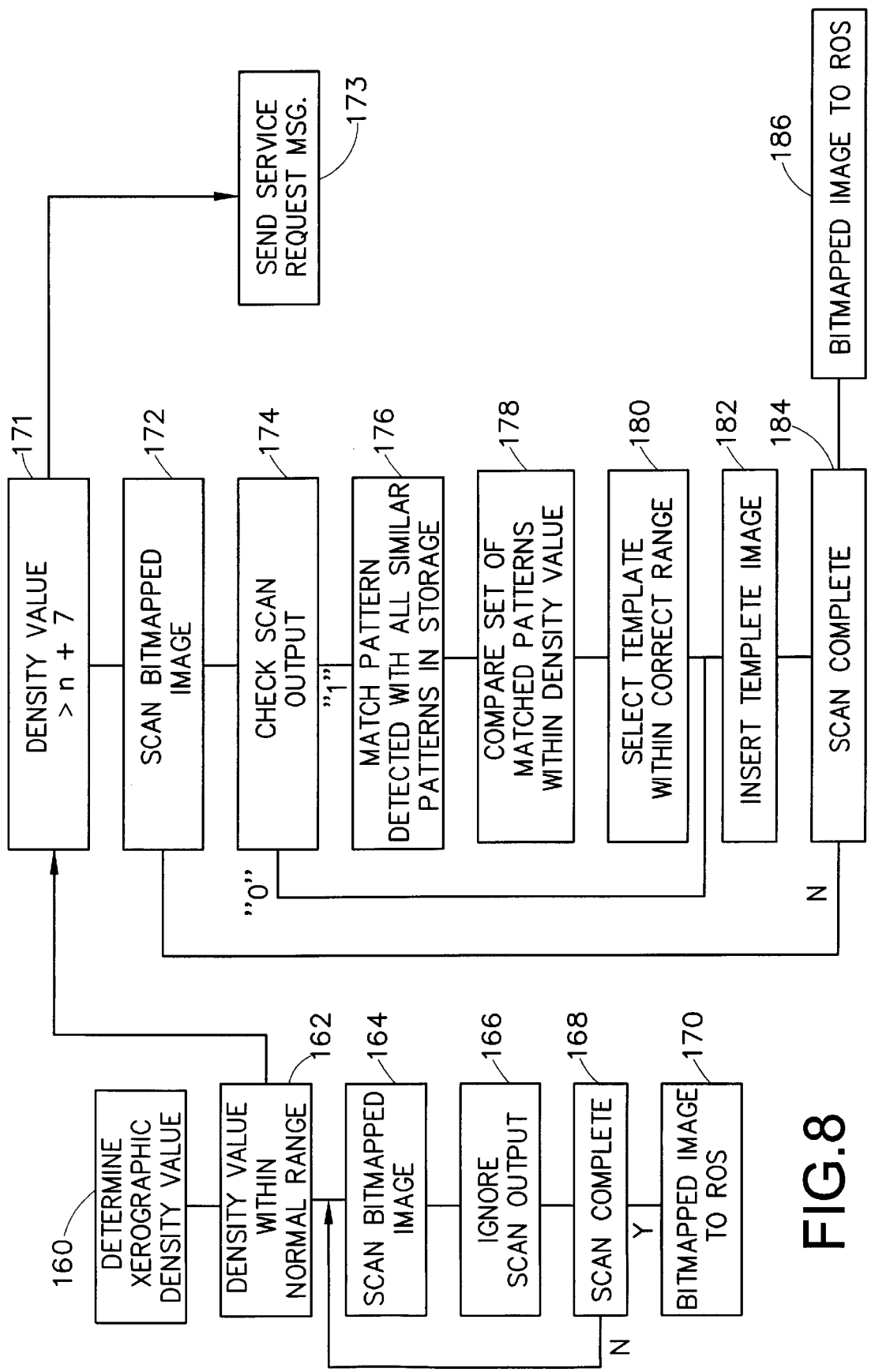
FIG. 8 is a flow chart setting forth alternative steps for adjusting the input binary image halftone dots using template-matching processing in accordance with a device as shown in FIG. 6.

As an alternative to the template storage configuration of FIG. 9, FIG. 10 illustrates a configuration more in line with the discussion of FIG. 8. In this storage all templates for a particular image bit pattern (i.e. for example the image pattern "L") are within a template set irrespective of the ranges of which they may correct. Therefore, under the operation of FIG. 8, a search will first be made for a bit pattern (i.e. "L"), then a comparison will be made between the patterns within this group to determine whether template 1 which corrects for n–5 to n–7; template 2 which corrects for n–2 to n–4; template 3 which corrects for a range of n+2 to n+4; or template 4 which corrects for a range of n+5 to n+7 is selected.

The foregoing is a generalized example which intends to show the concept of providing different storage configurations which each result in the desired outcome. The selection of the appropriate storage and processing technique will be dependant in part upon the machines which the present invention will be incorporated with and the operating specifications.

Returning attention to FIG. 6, once bitmapped scanned image 158 (either in an unaltered form from image 18"—when the xerographic density value has been found to be within an appropriate nominal range—; or with altered bit patterns—due to readings of the xerographic density values outside the nominal range—) has been fully scanned and forwarded to ROS 20", a photoreceptor image (i.e. Image 2) is formed on photoreceptor 92.

The preceding operation will be undertaken for each color separation (i.e. cyan, magenta, yellow and black) of an image to be printed. As an alternative, a single average reading may be used for the entire image.

It is to be appreciated that the present invention also anticipates being used when the printing machine output is operating at a less than nominal output (e.g. n–7 to n–5; n–3 to n–1; etc.). Under these conditions the general processes described will be equally applicable.

It is noted that the bitmap scanner arrangement 98 may be implemented in a variety of known scanning procedures. One well known example is the use of a sliding window operation which has been described generally above. Material incorporated herein by reference provide more specific details to such operation. It is worth noting however, that in the window sliding technique, such as anticipated for bitmap scanner arrangement 98, an appropriately sized window (i.e. 5×5, 9×9, etc.) is used. When it is determined during this scanning procedure that the bit density value is outside of the nominally accepted amount, the template matching procedure is instituted within the windowed area. Although it may be envisioned that the changes to the binary image information may occur outside the windowed area. Also, while uniform square type scanning windows are commonly used, other shaped scanning areas may also be implemented with the present invention.

FIG. 11 illustrates a selected template 190 with a pixel pattern which will replace an image pixel pattern 192 being scanned, for a printing machine which is running too "high." In this example, template 190 will have a smaller number of pixels in an "on" ("1") state, than pixel pattern 192. This is done in order to decrease the amount of toner output since the detected xerographic density is providing more toner than would be expected for the predetermined nominal density value. This example shows only a small portion (i.e. a single scan line section) of these bit patterns, normally stacks of templates are used to account for the various aspects of the image being altered in order to make correct assessments of the image.

What is occurring in a situation where the actual xerographic density values are greater or less than the nominal range (n−1 to n+1) is an indication that the xerographic process is providing more or less toner than a predetermined desired amount. Thus, in essence the present invention masks the fact that the xerographic system is not maintaining its pre-calibrated range. Therefore, at some point (i.e., greater than n+7 or less than n−7) a signal will be sent to the control system of the printing machine to indicate that it is necessary to repair the printer. In other words, the present invention does not actually correct the printing machine. Rather, it provides a template matching procedure to correct errors based on the state of the print engine (xerographic). More particularly, when the xerographic operation changes, the present invention institutes template matching operations to mask this failure in the machine.

Thus, the present invention obtains knowledge of an analog device (xerographics) and uses that knowledge to change the digital image in real-time thereby yielding a different density print than would be obtained otherwise.

FIG. 6 showed a series of test patches 90a–90n for a CMYK output. In this embodiment, the density testing is for an average of the entire page (per color separation) that is to be printed. However, as shown in FIG. 12, by appropriate placement of test patches and the use of multiple bit density detectors, a more refined interpretation of density values can be obtained, and used for a more refined correction of the scanned images.

For example, the density value of cyan patch 194a is determined to have a xerographic density value of n+6 at edge X of photoreceptor 92; cyan patch 194b at a center portion Y is found to be within the nominal range (n−1 to n+1); and cyan patch 194c at edge Z is found to be n−2. Based on these findings, the system can implement a first template matching procedure when cyan pixels at edge X of photoreceptor 92 are scanned and a separate processing (i.e. using the different xerographic density value information) when cyan pixels at edge Z of photoreceptor 92 are scanned. The templates for each of these bit pattern replacements will therefore have different correction values. At the same time when pixels in the middle of the image are scanned, there will be a "no-op" situation since cyan test patch 194b was determined to be in the nominal bit density range. This arrangement allows for a more refined control for areas smaller than a single image.

The discussed concept of scanning an image to obtain information in accordance with the present invention is well known and can be accomplished in a number of ways. One way cited in the present application is with a window scanning. The scanning data used in conjunction with the xerographic density values to determine whether a template-matching operation is necessary. The concepts of image scanning and template matching are known in the art and particular types of such scanning and template matching configurations are discussed in the following patents: Robinson, U.S. Pat. No. 5,729,634; Eschbach, U.S. Pat. No. 5,724,455; Rostamian, U.S. Pat. No. 5,483,605; Curry, U.S. Pat. No. 5,479,584; Baton et al., U.S. Pat. No. 5,404,411; Mailloux et al., U.S. Pat. No. 5,383,036; Loce, U.S. Pat. No. 5,359,423; Kang et al., U.S. Pat. No. 5,301,037; and Eschbach, U.S. Pat. No. 5,293,254. The foregoing patents are commonly assigned to the assignee of the present application, and are hereby incorporated by reference.

It is noted that once the detected xerographic density value is out of the predetermined acceptable range, the template-matching operation will be constantly applied.

Under a CMYK color scheme, with an understanding that there are four separations and five states of "density", and further with 100 pixel area coverage and 10 positions on a dot that are changeable, it can be estimated that there may be approximately 20,000 templates per dot. It is noted that the window which is used in the scanning operation should be of a significant enough size so it is possible for the scanning operation to view an entire "dot."

As previously discussed, it will also normally be necessary to have a stack of templates for each scanned area as it will be important to recognize each gray level being investigated. Essentially, the "dot" has various states that the templates must be able to recognize each area of coverage. Therefore a stack of templates per dot investigation results in improved efficiency of the present invention.

While template matching has been shown to be one manner of adjusting a binary image due to changes in density, a more general aspect of the present invention is in the concept of changing binary image values based on analog-sensed outputs. In particular, the present invention recognizes that knowledge regarding an analog device is obtained, and that knowledge is used to change a digital image in real-time. Therefore while template matching is a process which can be easily conformed to the present invention, it is also to be recognized that other forms of changing the binary image based on these analog outputs may also be practical. For example, instead of templates, other look-up tables or calculations may also be used.

Further, the described apparatus and method is useable in any direct digital imaging system, including but not limited to Liquid Ink, Elcography, Ink Jet, Thermal Transfer, and Dye Diffusion, among others. Particularly, the apparatus and method includes applying template-based corrections to a latent digital image based on feedback from a current process state.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Thus, having described the preferred embodiments, the invention is now claimed to be:

1. An apparatus for maintaining image quality in a printing system comprising:

a process state detector which detects a process state of the printing system;

a template matching device configured to receive data from the process state detector regarding the process state of the printing system;

an image scanner for scanning a raster image; and a template storage which stores a plurality of predefined templates of raster patterns, wherein the data from the process state detector is used to determine whether at least a portion of the raster image is to be replaced by at least one of the plurality of predefined templates through operation of the template matching device.

2. The apparatus according to claim 1 wherein the data from the process state detector is collected based on analog signals, and the raster image is configured in accordance with digital signals, such that output analog signals of the printing system are used to alter the raster image.

3. The apparatus according to claim 1 wherein said template matching device is configured to receive the raster image in binary form and represents at least one of a monochrome or a color image.

4. The apparatus according to claim 1 wherein the process state being detected is that of a density of a marking material located on a surface, and the surface is at least one of paper and a photoreceptor, and the marking material is located on at least one of paper and the photoreceptor.

5. The apparatus according to claim 4 wherein the marking material are for colors which the printing system uses to print images.

6. The apparatus according to claim 5 wherein the density detector is configured to separately detect each of the colors of the marking material, and each separately detected density value is used in separate scanning operations for each color.

7. The apparatus according to claim 5 wherein the process state detector is configured to detect different density values across the paper and photoreceptor for the same color, whereby the template matching device uses the different values in determining whether a portion of the scanned image is to be replaced with a stored template and said apparatus maintains output print quality at a real-time update rate.

8. An apparatus for maintaining image quality in a printing system comprising:
 a page description module which contains image data of an image to be printed by the printing systems;
 a raster image processor configured to receive the image data from the page description module;
 a raster image generated by the raster image processor;
 a process state detector arrangement for detecting process state information of the printing system;
 a template matching module configured to receive the raster image and the process state information, and to perform selective template matching operations on the raster image dependent upon the process state information; and
 a raster output scanner designed to receive raster patterns from the template matching module representing the raster image to generate a replacement image of the raster image.

9. The apparatus according to claim 8 wherein the template matching module includes an image scanner for scanning the raster image.

10. The apparatus according to claim 8 wherein the template matching module includes a template storage which holds a plurality of templates to be used in the template matching operation and said apparatus maintains image quality at a real-time update rate.

11. The apparatus according to claim 8 wherein the process state is a state of a marking material which is at a predefined location, the predefined location being on one of paper and a photoreceptor, and the marking material is one of ink and toner formed as test patches located on the at least one of paper and photoreceptor.

12. A method of maintaining consistent processing of output prints generated by a printing system, the method comprising:
 detecting a process state value for the printing system to determine whether the process state value is outside a predetermined value;
 scanning a raster image until a predetermined state is encountered;
 searching a template storage for a raster pattern matching at least a portion of the raster image being scanned when the predetermined state is encountered and the detected process state value is outside the predetermined value; and
 selecting a template raster pattern from the template storage which matches the portion of the raster image being scanned and which will result in the processing state value being within the predetermined value when an output image is formed, whereby template-based corrections to a latent digital image are made based on feedback from a current process state.

13. The method according to claim 12 wherein the step of searching the template storage includes,
 searching templates for a match to the raster pattern of the scanned image;
 determining the existence of a set of templates that match the raster pattern of the scanned image; and
 selecting from among the template set, the template raster pattern which will result in that portion of the scanned image being printed with a process state value within an acceptable range.

14. The method according to claim 12, wherein the step of searching the template storage further includes,
 searching for templates stored in the template storage in accordance with ranges outside of an acceptable process state value range;
 determining the range of the detected process state value; and
 searching the template storage for a template matching the portion of the image raster pattern being scanned, by searching within the range which corresponds to the detected process state value and the range of the template storage.

15. The method according to claim 12 further including the steps of,
 detecting a process state value greater than a range which can be corrected; and
 issuing a service request signal upon the detection of the process state value greater than the range which can be corrected.

16. The method according to claim 12 wherein the ranges which can be corrected include both ranges where actual output of a marking material is less than an optimal amount and also greater than the optimal amount.

17. The method according to claim 12 wherein the image raster pattern being scanned is representative of a color image, and the steps of detecting, scanning, searching and selecting are repeated for each color represented in the color space of the color image.

18. The method according to claim 17 wherein the detecting of the process state value further includes detecting each one of multiple process state values for different locations of a printing system, and using each detected process state value in determining a range for each portion of the raster image being scanned, whereby a single color located at different spatial representations within the raster image may have a process state value different from another portion of the raster image of the same color.

19. The method according to claim 12 wherein the step of scanning the raster image includes transforming the raster image directly into a binary format.

20. The method according to claim 12 further comprising, reacting to changes in xerographic density state values at a real-time update rate to maintain output print quality.

* * * * *